United States Patent
Baumeister et al.

(10) Patent No.: US 10,305,353 B2
(45) Date of Patent: May 28, 2019

(54) THERMALLY CONDUCTIVE MATERIAL BETWEEN ROTOR COIL AND CORE FOR IMPROVED COOLING

(71) Applicant: ALSTOM Renewable Technologies, Grenoble (FR)

(72) Inventors: Stefan Baumeister, Küssaberg (DE); Simon Andreas Frutiger, Lenzburg (CH)

(73) Assignee: GE RENEWABLE TECHNOLOGIES, Grenoble (FR)

( * ) Notice: Subject to any disclaimer, the term of this patent is extended or adjusted under 35 U.S.C. 154(b) by 570 days.

(21) Appl. No.: 14/553,163

(22) Filed: Nov. 25, 2014

(65) Prior Publication Data
US 2015/0155751 A1    Jun. 4, 2015

(30) Foreign Application Priority Data

Nov. 29, 2013    (EP) ...................................... 13195082

(51) Int. Cl.
*H02K 9/22*    (2006.01)
*H02K 3/30*    (2006.01)
(Continued)

(52) U.S. Cl.
CPC ................ *H02K 9/22* (2013.01); *H02K 3/30* (2013.01); *H02K 3/345* (2013.01); *H02K 3/527* (2013.01); *H02K 2213/03* (2013.01)

(58) Field of Classification Search
CPC .. H02K 3/30; H02K 3/32; H02K 3/34; H02K 9/00; H02K 9/005; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197; H02K 9/20; H02K 9/22
(Continued)

(56) References Cited

U.S. PATENT DOCUMENTS 2,769,104 A * 10/1956 Hirsch ...................... H02K 9/22
310/194
6,509,665 B1 * 1/2003 Nishiyama ............... H02K 9/22
310/194
(Continued)

FOREIGN PATENT DOCUMENTS

DE    102010064072 A1 *  6/2012  ............... H02K 9/22
JP       2002118997 A     4/2002

OTHER PUBLICATIONS

Heid Thomas, Nommensen Bjoern, Carrier Tooth for use Drive Motor, Jun. 28, 2012, Bosch GMBH Robert, DE 102010064072 (English Machine Translation).*

Primary Examiner — Bernard Rojas
Assistant Examiner — Alexander A Singh
(74) Attorney, Agent, or Firm — Dority & Manning, P.A.

(57) ABSTRACT

The present invention relates to a rotor for a rotating machine and more in particular, to a component of the rotor. The present invention generally relates to an improved cooling configuration of a rotating machine. Unlike generally known arrangements, the solution proposed herein does not guide coolant fluid to parts which require cooling. Instead, the heat generated from the losses in the rotor pole is transferred to parts having favourable characteristics for establishing heat exchange.

12 Claims, 4 Drawing Sheets

(51) Int. Cl.
*H02K 3/34* (2006.01)
*H02K 3/52* (2006.01)

(58) Field of Classification Search
USPC ..... 310/52, 53, 54, 55, 56, 57, 58, 59, 60 R, 310/61, 62, 63, 64, 65
See application file for complete search history.

(56) References Cited

U.S. PATENT DOCUMENTS

| | | | |
|---|---|---|---|
| 2003/0193256 A1* | 10/2003 | Liebermann | H02K 9/22 |
| | | | 310/194 |
| 2007/0222307 A1 | 9/2007 | Sawa et al. | |
| 2009/0015094 A1* | 1/2009 | Yoshitake | H02K 3/34 |
| | | | 310/257 |
| 2010/0289350 A1* | 11/2010 | Watanabe | H02K 3/522 |
| | | | 310/63 |
| 2013/0207395 A1* | 8/2013 | Huang | H02K 9/19 |
| | | | 290/46 |

* cited by examiner

THERMALLY CONDUCTIVE MATERIAL BETWEEN ROTOR COIL AND CORE FOR IMPROVED COOLING

CROSS-REFERENCE TO RELATED APPLICATIONS

This application claims priority to European application 13195082.6 filed Nov. 29, 2013, the contents of which are hereby incorporated in its entirety.

TECHNICAL FIELD

The present disclosure relates to a rotor for a rotating machine. More in particular, the present invention relates to a component of the rotating machine comprising a rotor pole. The present disclosure generally relates to an improved cooling configuration of a rotating machine.

BACKGROUND

State-of-the-art electric energy conversion relies on a three-phase power network with alternating currents (AC) at 50 Hz or 60 Hz frequency and a voltage levels ranging from several hundreds of Volts to hundreds of thousands of Volts. The conversion of rotating mechanical energy into electric energy and vice versa is done by generators and by motors, respectively. Those rotating machines can be divided into asynchronous and synchronous apparatuses.

Motors and generators comprise a stator and a rotor. The rotor of the machine rotates inside the stator bore of the stator. Synchronous machines with salient poles generate the magnetic field typically through rotor poles which include a pole core having a rotor winding wrapped around it. The number of rotor poles and the frequency of the stator magnetic field define the number revolutions per minutes (rpm) of the rotating machine. The electric resistance of the winding of a rotor leads to resistive losses therein. In general, these losses need to be considered during design and the rotor needs to be cooled. Cooling mechanisms for rotors typically rely on a cooling fluid such as water, hydrogen or air. This disclosure focuses on air-cooled rotors. The teachings of this disclosure do, however, also apply to other types of machines.

In air-cooled machines, the losses in the form of heat have to be transferred away from the rotor through convection. The effectiveness of cooling through convection depends on flow of air (volume per time), on the temperature of the coolant, and on the coefficient of heat transfer. In certain machines, it can be challenging to supply all regions that need to be cooled with cooling air.

Should a region inside a rotor not be cooled sufficiently, then the machine may locally overheat in that region. Generally speaking, heat transfer through convection is determined by the formula $$Q = \alpha \cdot A \cdot \Delta T$$

where:
Q denotes the flow of heat per time [W];
$\alpha$ denotes the coefficient of heat transfer [W/m2. K];
A denotes the surface available for cooling [m2]; and
$\Delta T$ denotes the temperature difference between solid and fluid temperature [K].

Heat transfer through convection may be influenced by altering the following parameters:

1. The coefficient of heat transfer $\alpha$ depends on the flow characteristics (turbulence) of the coolant fluid and on the characteristics (roughness) of the surface dissipating heat.
2. The temperature difference $\Delta T$ is calculated as the difference between the temperature of the surface dissipating heat and the coolant fluid absorbing losses in the form of heat. By lowering the temperature of the coolant fluid, the temperature of the surface dissipating heat will also decrease. Typically, the temperature of the fluid can be lowered by increasing the flux of coolant volume per time. Alternatively, the temperature of the coolant at the inlet may be reduced.
3. Cooling fins may be added to increase the surface A dissipating heat.

Conventional designs make best use of these parameters in an attempt to achieve an optimum result. When the designer runs out of options, he may add additional cooling surfaces to reduce temperatures. This technique is also known as rear ventilation of a rotor coil and is typically applied to salient pole machines. Rear ventilation of a rotor coil means that the rear part of rotor coil forms an active part of the cooling circuit. This measure is, however, seldom applied as it involves a significant design change and especially a major change of the cooling concept of a machine. In addition, rear ventilation of a rotor coil is often in conflict with other mechanical requirements of the machine, especially since additional conduits must be provided for the cooling air. Those additional conduits tend to impair the mechanical integrity of a machine.

Therefore it should be understood that optimizing these parameters can be difficult, because sometimes they are in conflict with other design parameters. Increasing the volume flow for example is having a positive impact on the heat transfer coefficient, but on the other hand the bigger volume flow is creating more ventilation losses. Besides this conflict, it is almost impossible to improve the thermal situation in certain areas of the machine. For example, it is very difficult to increase the amount of cooling air between two pole coil supports because the air path is substantially blocked. If such situation occurs, changing the cooling schema sometimes is an opportunity. One possibility for example is what it is usually known as "back cooling". In this case the cooling surface is increased by creating an additional air path between rotor winding and pole body. The disadvantages are that there is the danger of dust accumulation in this region (increasing the risk of short circuits) and the weakening of the rotor pole core. The present disclosure is oriented towards providing the aforementioned needs and towards overcoming the aforementioned difficulties.

SUMMARY

According to preferred embodiments, the object of the present invention is a rotor pole for a rotating machine with an improved cooling system.

Unlike the aforementioned rear ventilation, the solution proposed herein does not guide coolant fluid to parts which require cooling. Instead, the heat generated from the losses in the rotor pole is transferred to parts having favourable characteristics for establishing heat exchange.

This object is achieved by a component according to independent claim 1 and by a rotor according to claim 13. It is yet another object of the present invention to provide a rotating machine for the generation of electricity wherein heat transfer through conduction is improved. Accordingly, the rotating machine of the present invention will not reach temperature peaks which could damage its various parts. Therefore, according to various preferred embodiments, the rotating machine according to the present invention requires less coolant fluid and thus yields lower ventilation losses. The service life of the rotating machine is then increased, due to lower temperatures of its parts.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION

Figure 1:
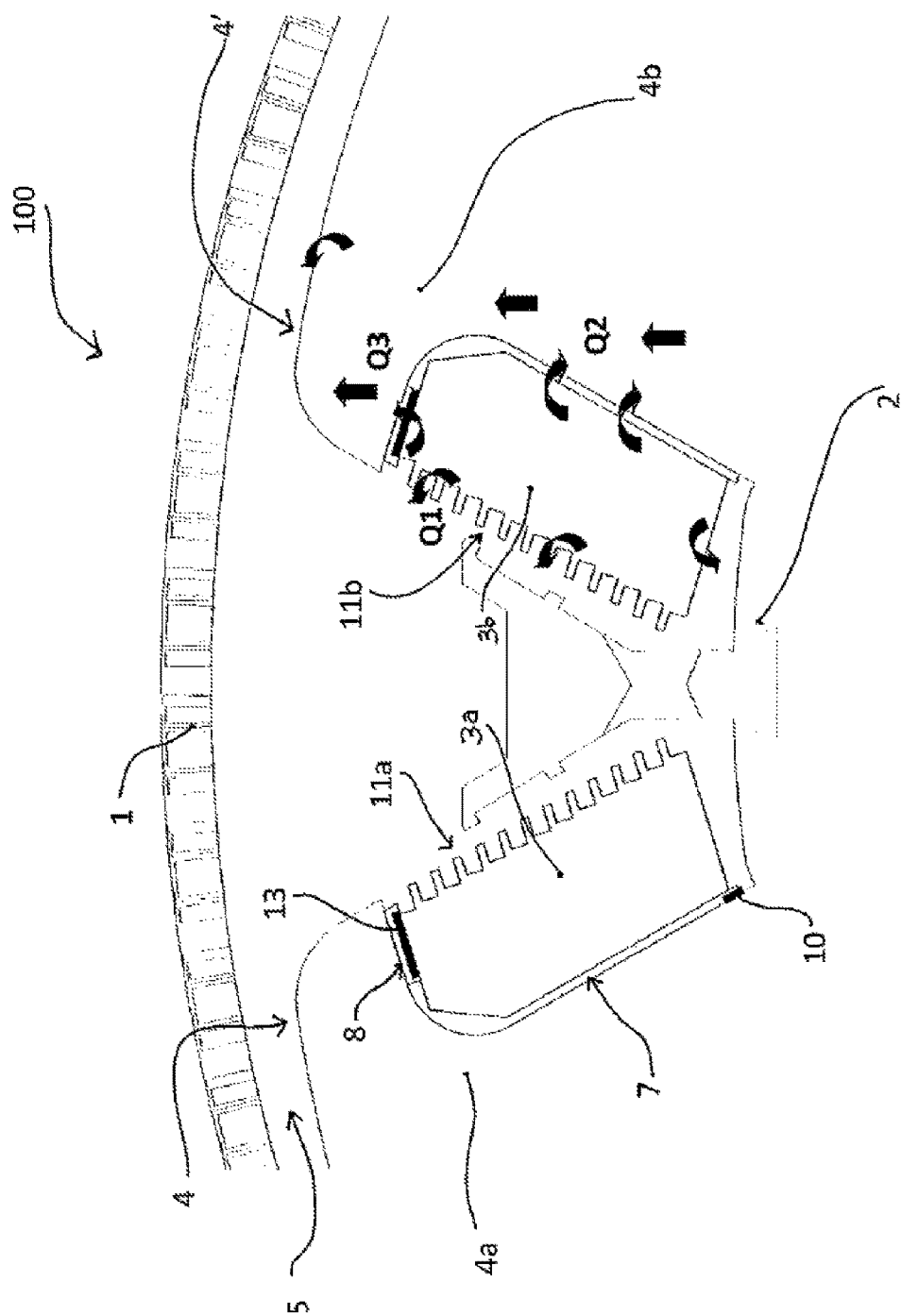
FIG. 1 is a two-dimensional schematic presentation of a section of a rotating machine 100 according to the prior art.

FIG. 1 is a two-dimensional schematic presentation of a rotating machine 100 according to the state of the art.

The rotating machine 100 comprises a stator 1 and of a rotor 2 separated by an air gap 5. In particular, the figure shows a view of the rotating machine along a plane perpendicular to the rotor axis. The rotor 2 comprises, in the example of the figure, a component generally indicated with the numerical reference 4, which comprises a rotor pole 4, which in turn comprises a pole core 4a. In the figure is also shown a consecutive component 4' which comprises a rotor pole 4 which in turn comprises a pole core 4b.

It will be appreciated that the number of rotor poles present on the rotor 2 will vary according to the type of required machine and thus to the number of the poles needed. It will also be appreciated that features which will be disclosed for a rotor pole, for example the rotor pole 4, will also apply for rotor pole 4' and in general for all the rotor poles of the rotor 2.

Reference will be now made to the rotor pole 4, as a non-limiting example.

The rotor pole 4 comprises the pole core 4a and a rotor coil 3a arranged around it. Similarly, the rotor pole 4' comprises a rotor coil 3b.

In general, rotor coils 3a, 3b form part of a rotor winding. The technical knowledge necessary to achieve such arrangement is known to those who are skilled in the art, and therefore it won't be described further.

The rotor coil 3a is arranged around the pole core 4a in such a way that gaps between the coil and the core are formed. In particular, in the example here described, the pole core presents a mushroom-like shape, therefore forming a first lateral gap 7 and a second upper gap 8.

The formation of the gaps between the pole core and the rotor coil is generally necessary as the presence of gaps avoids the direct contact between the pole core and the coil which could cause short-circuits occurrences.

For this reason, according to the known art, distance means in a form of a cord 10 is disposed at the bottom portion of the gap 7. The presence of such cord, in addition to avoiding technical problems, provides the absence of possible pollution on the back side of the machine. In machines with conventional cooling, the gap 7 is filled with air.

Concerning the second upper gap 8, an insulation flange 13 is arranged, of which only a section through a plane perpendicular to the rotor axis is visible.

Commonly, most of the losses of the rotor coil are dissipated via convection in the pole gap region. Some of the losses are transferred by conduction through the insulation frame 13 to the rotor pole core and finally dissipated via convection in the air gap region 5. In the same way some of the losses are dissipated through the gap 7 on the backside of the pole coil.

The amount of losses which are dissipated between the rotor coil 3a and pole core 4a through the second upper gap 8, by means of the insulation frame 13, and through the first lateral gap 7, by means of the air contained therein, is relatively small because the material of the insulation frame (typically HGW) and especially the air (evacuated/still standing) in the gap are very poor thermal conductors.

As known, because of the nature of insulating materials (Wiedemann-Franz law), the heat conductivity of the insulating flange 13 is very low.

Moreover, the cooling which occurs through the air gap 7 is less effective than cooling between the rotor and the stator through surfaces 11a, 11b of the coils 3a and 3b, which are directly in contact with the air gap 5. This is because the air gap 7 is not part of the cooling circuit of the machine. Splitting the heat flow in three passes (neglecting the shaft side), it is possible to schematize it as detailed below. For sake of clarity the following scheme is made with reference to the rotor pole 4', but it will be appreciated that the following explanation will apply to each pole of the rotor.

Q1 indicates the convective heat flow from the rotor coil through the outer surface 11b. Normally, Q1 is the biggest part of the all over heat flow. Q2 indicates the conductive heat flow from the rotor coil 3b to the pole core 4b through the air gap while Q3 represents the conductive heat flow occurring through the insulation flange. Q2 is small and Q3 is close to zero due to the fact that the thermal resistances are very high.

Assuming that the volume flow of cooling air is fixed, a certain temperature gradient between the air and the solid will arise to transfer the losses through the heat flow Q1. Conventional cooling of rotor windings has its limitations due to the limited heat conductivities of the insulating flange and the air gap between coil and pole core.

Figure 2:
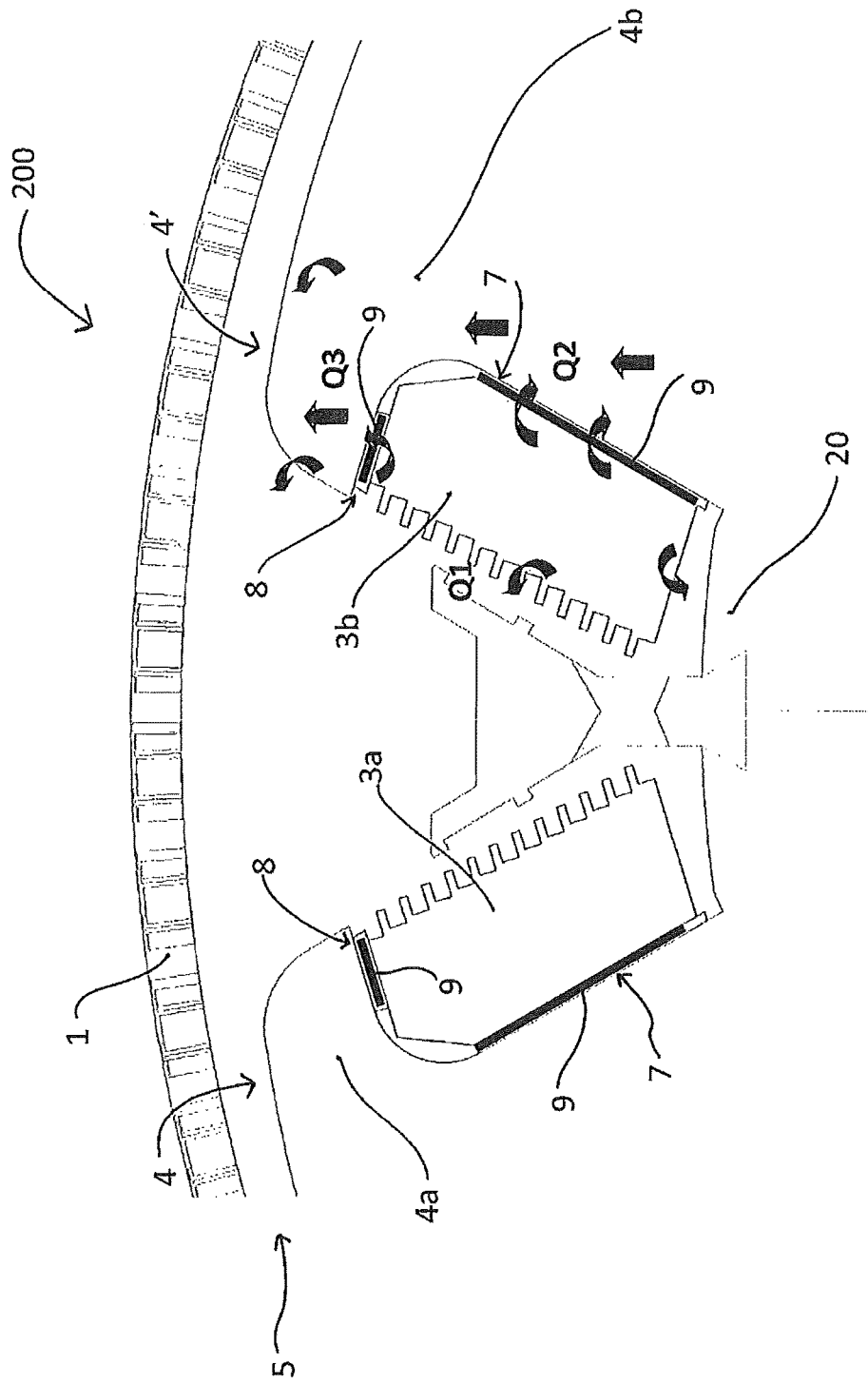
FIG. 2 is a two-dimensional schematic presentation of a section of a rotating machine 200 according to the present invention.

With reference now to FIG. 2, it is illustrated a rotating machine 200 according to the present invention. According to the proposed solution, the above discussed gaps 7 and 8 existing between the rotor coils 3a, 3b with pole core 4a, 4b respectively, are now at least partially filled with material having a thermal conductivity which is greater than the thermal conductivity of fluids and/or materials (in particular air and insulating flanges according to the known art) currently used in known arrangements.

In particular, the air filling the gap 7 has a thermal conductivity substantially equal to 0.025 W/mK, while the material used for the insulating flange has a thermal conductivity which is substantially equal to 0.25 W/mK.

The first lateral gap 7 may then be filled with a material 9 having a thermal conductivity which is substantially greater than the indicated value of 0.25 W/mK.

Also, the second upper gap 8 may also be filled with a material having such characteristic.

With reference now to the scheme illustrated in association to the pole core 4b (even though the following applies to each rotor pole of the rotor), the gaps are filled with material having such heat conductive characteristics within the gaps 7 and/or 8 such that the thermal resistances of path Q2 and/or Q3 will lead to a smaller heat flow in Q1. Accordingly, a lower temperature gradient between cooling air and solid is thus achieved resulting in a lower temperature level on the solid side. A lower thermal resistance of the path Q2 and/or Q3 is then achieved by using thermal higher conductive materials. It will be appreciated that the choice of materials having such characteristics will also fulfil electrical requirements. Some basic information concerning calculation of heat flows Q2 and Q3 through conduction are included for completeness:

$$\dot{Q} = \lambda \cdot \frac{A}{l} \cdot \Delta T$$

$$R_\lambda = \frac{1}{\lambda} = \frac{\Delta T \cdot A}{\dot{Q} \cdot l}$$

$$R_{th} = \frac{l}{\lambda \cdot A}$$

Wherein:

$\dot{Q} = HeatFlow[W]$ (losses to be removed)

$\lambda = $ Thermal conductivity$[W/mK]$ $A = $ Surface$[m^2]$ $\Delta T = $ Temperature difference$[K]$ (difference between two neighbour solids or within a solid)

$l = $ Thickness$[m]$ $R_A = Spezific$ thermal resistivity$[K \cdot m/W]$ $R_{th} = $ absolute thermal resistivity$[K/W]$ Q1 is a convective heat flow and therefore calculated by the formula shown in chapter "BACKGROUND".

Figure 3:
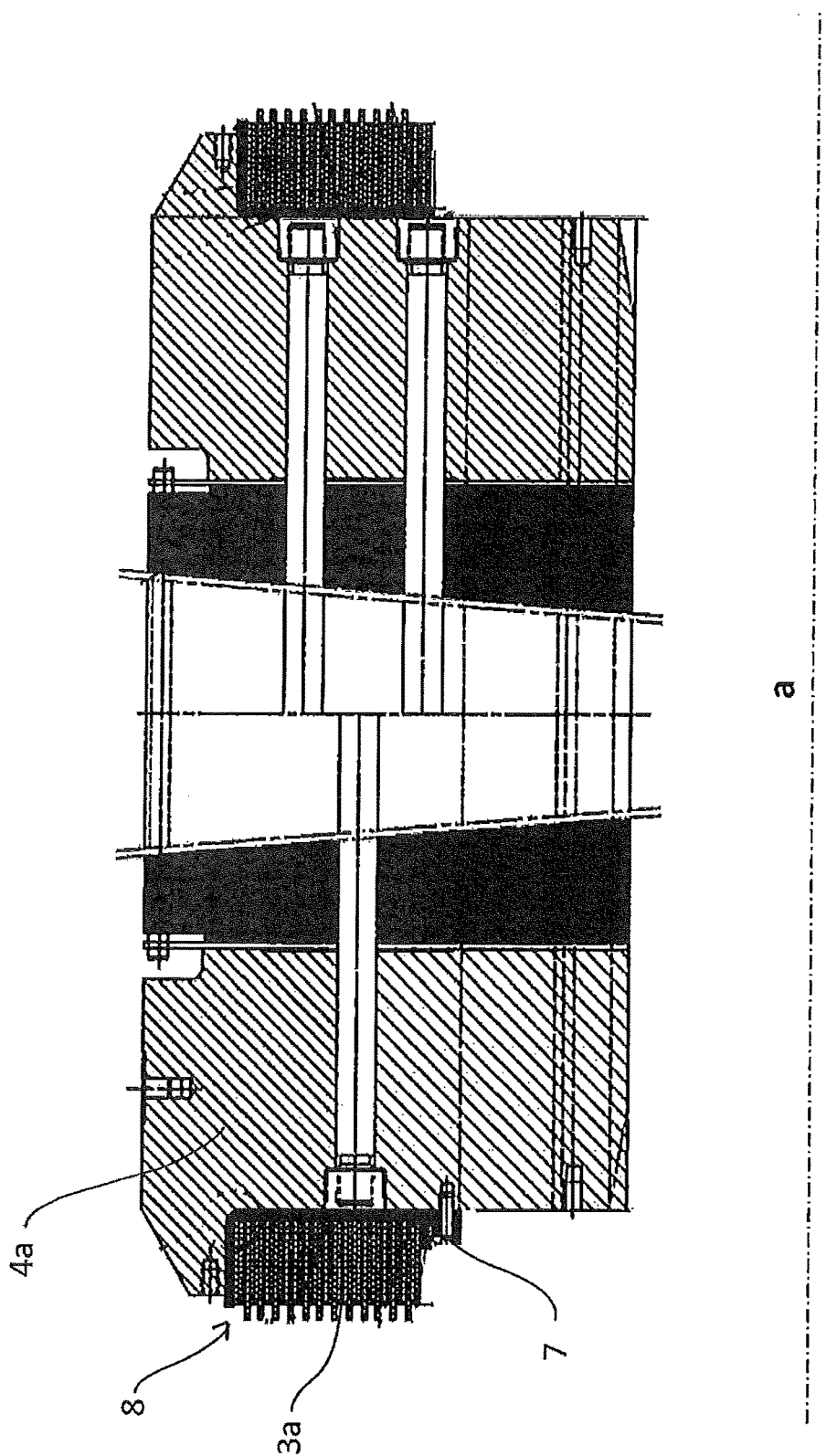
FIG. 3 is a view of a section along a radial plane of a component according to the present invention.

With reference now to FIG. 3, it is shown a section along a radial plane, with respect to a rotating axis a of the rotating machine, of a pole core 4a now in its full extent. The sections of the gaps 7 and 8 are also visible.

Figure 4:
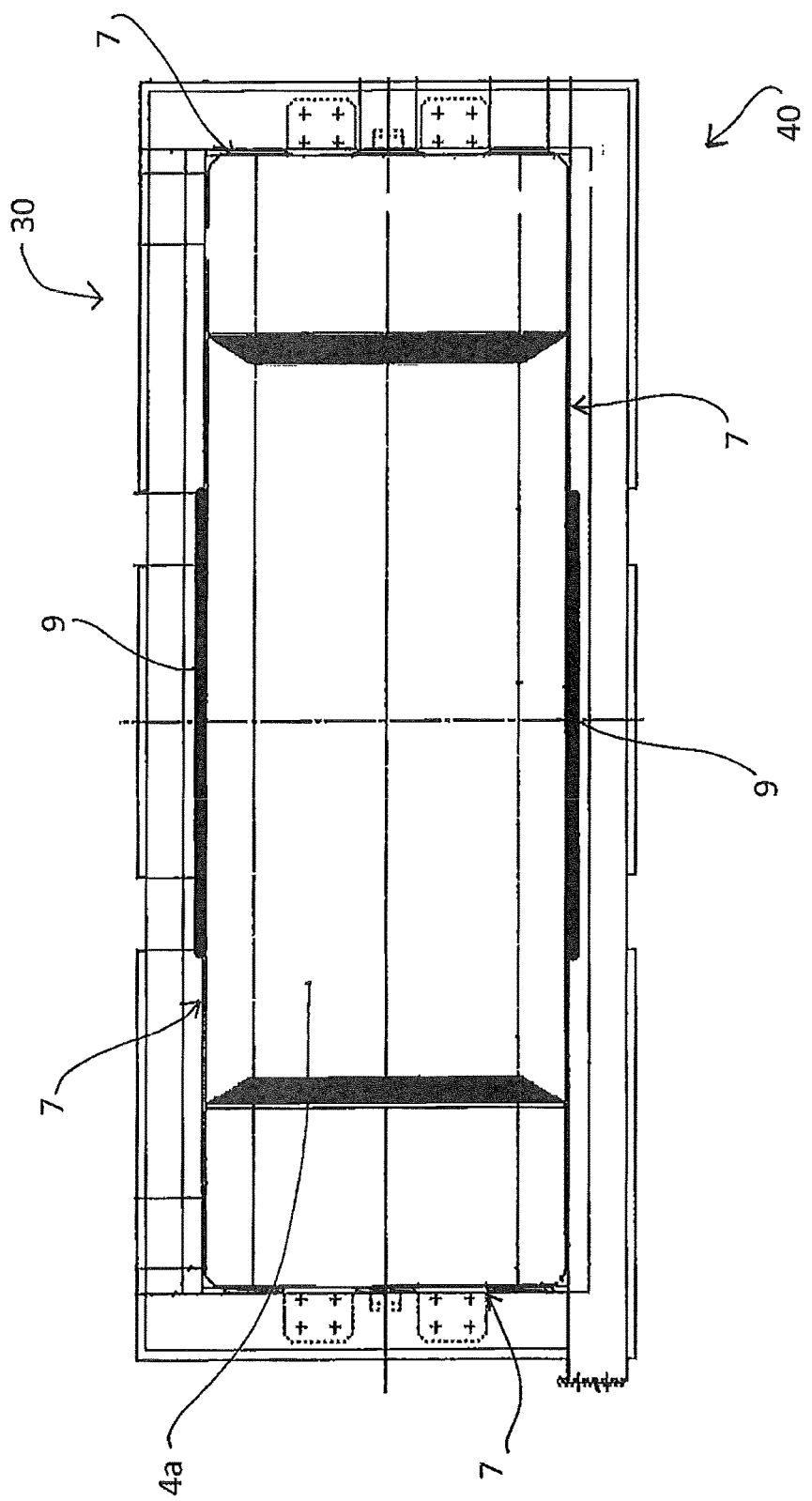
FIG. 4 is a view of a section along a tangential plane of the component of FIG. 3.

FIG. 4 illustrates a section of the pole core 4a along an axial plane of the rotating machine. In particular, it can be clearly seen that the gap 7 is displaced perimetrally around the pole core 4a.

According to a preferred embodiment of the invention, the material 9 is preferably disposed along only two opposite sides 30, 40 of the gap 7 aligned with the rotating axis a of the rotating machine (depicted in FIG. 3), when the pole core is mounted therein.

Preferably, the material chosen for filling the gaps 7 and/or 8 may have a higher thermal conductivity. In particular, such filling material can have a coefficient equal or greater than 1 W/mK. To even increase the heat flow according to the above scheme, thus reducing even more the convection heat flow associated to Q1 while increasing the conduction heat flows related to Q2 and Q3 between the coil and the pole core, a material featuring a coefficient selected between the range of 20-80 W/mK might be chosen for achieving such advantageous technical effect.

In a preferred embodiment, the material may be thermally high conductive silicone. The silicone formulation may be either room temperature vulcanizing or it may vulcanize at elevated temperatures. It is also advantageous to use silicone in the form of foam or in the form of a sheet.

An example of such material may be the thermally conductive soft-silicone film KU-TCS known on the market with the name HEATPAD® manufactured by the Kunze Company. This kind of material is therefore known to those skilled in the art, and therefore it won't be herewith described further. The silicone can be arranged in the gaps in the form of plates or compounds.

In particular, a silicone formulation may be provided in the form of a resin or glue and inserted, when still in a liquid form, into the gaps described above during the assembly of the rotating machine. After the insertion, the silicone consolidates and becomes solid, this way achieving a very efficient filling operation in the gaps between the rotor coil and the pole core thus providing an excellent transfer process.

Alternatively or additionally, the material inserted in the gaps can be aluminum oxide and/or aluminum nitride which can be provided as powders or in the form of plates. It is also technically viable and envisaged to use a silicone formulation that contains aluminum oxide and/or aluminum nitride particles dissolved in the silicone matrix.

In particular the aluminum oxide and the aluminum nitride are particularly preferred as they characterized by a very high thermal conductivity (within the range of 50-100 W/mK) and very good electrical insulation properties.

It will be appreciated that different combination of filling materials may be arranged between the gaps 7, 8 according to the particular use-case scenario.

The above materials can thus be inserted in the gaps 7 and/or 8. This way, an insulating flange with improved heat conductivity may be obtained. With respect to the known art, in making effective use of the lateral gap 7 and of the insulating flange for heat transfer, more heat can be dissipated through these paths. Less heat will then have to be dissipated through convection on the outer surfaces 11a, 11b of the rotor coils. Consequently, a smaller temperature difference ΔT over the gap 7 or over the insulating flange will suffice to dissipate losses. This means the parts that make up the rotor will run at lower temperatures. Lower temperatures of machine parts tend to prolong the useful service life of the machine.

Improved heat transfer through the gap 7 and through the insulating flange also allows a reduction of the surfaces involved in heat conduction and in convection. That way, the thermal constraints can be relaxed and the machine can have a more compact design.

Although the present invention has been fully described in connection with preferred embodiments, it is evident that modifications may be introduced within the scope thereof, not considering the application to be limited by these embodiments, but by the content of the following claims.

The invention claimed is:

1. A component for a rotating machine comprising a rotor pole, the rotor pole comprising;
    a pole core; and
    a rotor coil arranged around said pole core, wherein said rotor coil is separated from the pole core such that at least a gap is formed in between the rotor coil and the pole core;
    wherein said at least a gap is partially filled with a material having a thermal conductivity substantially greater than 0.25 W/mK;
    wherein the pole core is mushroom-shaped such that a first lateral gap and a second upper gap are formed between the pole core and the rotor coil;
    wherein said first lateral gap is perimetral around the pole core, the material being inserted only within two opposite sides of said first lateral gap without extending around perimetral ends of said first lateral gap, the sides filled with said material being aligned with a rotating axis (A) of the rotating machine when the pole core is mounted therein; and said second upper gap transverse to said first lateral gap and defined between an upper top side of the rotor coil and an underside the mushroom-shaped pole core, the material also filled in said second upper gap between and against the underside of the mushroom-shaped pole core and the upper top side of the rotor coil and spaced apart from said material in said first lateral gap by an air gap.

2. The component according to claim 1, wherein the thermal conductivity of the material is substantially equal or greater than 1 W/mK.

3. The component according to claim 1, wherein the thermal conductivity of the material has a value comprised within a range of 20-80 W/mK.

4. The component according to claim 1, wherein the thermal conductivity of the material has a value comprised within a range of 50-100 W/mK.

5. The component according to claim 1, wherein the material is a thermally high conductive silicone.

6. The component according to claim 5, wherein the material is a silicone matrix comprising aluminum oxide and/or aluminum nitride particles dissolved therein.

7. The component according to claim 5, wherein the material is in the form of consolidated glue or resin inserted within said gaps.

8. The component according to claim 1, wherein the material is aluminum oxide and/or aluminum nitride.

9. The component according to claim 8, wherein the material is in the form of powder or grain.

10. The component according to claim 1, wherein the material has a form of one or more plates.

11. A rotor for a rotating machine comprising at least a component according to claim 1.

12. A rotating machine comprising a rotor according to claim 1.

* * * * *